(12) United States Patent
Bradley et al.

(10) Patent No.: US 8,567,706 B2
(45) Date of Patent: Oct. 29, 2013

(54) WOOD CHIPPER FEED ROLLER

(75) Inventors: Jeffrey D. Bradley, Pella, IA (US);
Edwin N. Galloway, Pella, IA (US);
James L. O'Halloran, Pella, IA (US);
Justin J. Humpal, Monroe, IA (US)

(73) Assignee: Vermeer Manufacturing Company,
Pella, IA (US)

( * ) Notice: Subject to any disclaimer, the term of this patent is extended or adjusted under 35 U.S.C. 154(b) by 324 days.

(21) Appl. No.: 12/599,629

(22) PCT Filed: May 1, 2008

(86) PCT No.: PCT/US2008/062207
§ 371 (c)(1),
(2), (4) Date: Aug. 9, 2010

(87) PCT Pub. No.: WO2008/140953
PCT Pub. Date: Nov. 20, 2008

(65) Prior Publication Data
US 2010/0294869 A1    Nov. 25, 2010

Related U.S. Application Data

(60) Provisional application No. 60/928,927, filed on May 10, 2007.

(51) Int. Cl.
*B02C 18/22*      (2006.01)
(52) U.S. Cl.
USPC .......................................... 241/225; 241/280
(58) Field of Classification Search
USPC ........... 241/92, 280, 281, 242, 243, 222, 224, 241/225
See application file for complete search history.

(56) References Cited

U.S. PATENT DOCUMENTS

| | | | |
|---|---|---|---|
| 2,561,069 | A | 7/1951 | Peterson |
| 2,821,345 | A | 1/1958 | Donath |
| 2,927,740 | A | 3/1960 | Berk |
| 3,182,917 | A | 3/1963 | Tamny |
| 3,516,539 | A | 6/1970 | Gulstrom et at |
| 3,523,411 | A | 8/1970 | Waldrop et al. |
| 3,701,483 | A | 10/1972 | Crosby et al. |
| 3,825,192 | A | 7/1974 | Knight |
| 3,863,848 | A | 2/1975 | Mashuda |
| 3,944,146 | A | 3/1976 | Stockmann et al. |
| 3,955,765 | A | 5/1976 | Gaitten |
| 3,990,568 | A | 11/1976 | Wilson, Sr. |
| 4,069,911 | A | 1/1978 | Ray |

(Continued)

FOREIGN PATENT DOCUMENTS

JP       2004167797 A    6/2004

OTHER PUBLICATIONS

Dutch Dragon E-Chipper 6060, www.dutchdragon.nl, 4 pages (undated).

(Continued)

*Primary Examiner* — Mark Rosenbaum
(74) *Attorney, Agent, or Firm* — Merchant & Gould PC

(57) ABSTRACT

A feed system that is configured to more effectively grab and pull brush and tree materials into a chipper is provided. The system of the present disclosure is configured such that a large, heavy tree trunk can be continuously pulled into the chipper. The system includes two feed rollers one above the other in an offset arrangement.

21 Claims, 8 Drawing Sheets

(56) References Cited

U.S. PATENT DOCUMENTS

| | | | |
|---|---|---|---|
| 4,073,377 A | 2/1978 | Stoessel et al. | |
| 4,078,590 A | 3/1978 | Smith | |
| 4,078,592 A | 3/1978 | Standal | |
| 4,078,734 A * | 3/1978 | Purrer | 241/222 |
| 4,223,845 A | 9/1980 | Selonke et al. | |
| 4,338,985 A * | 7/1982 | Smith et al. | 144/34.1 |
| 4,340,137 A | 7/1982 | Foster | |
| 4,510,981 A | 4/1985 | Biller | |
| 4,515,318 A | 5/1985 | Savonjousi | |
| 4,598,745 A | 7/1986 | Parviainen | |
| 4,625,924 A | 12/1986 | Killinger | |
| 4,632,318 A | 12/1986 | Hyuga | |
| 4,633,776 A | 1/1987 | Blackmore et al. | |
| 4,651,936 A * | 3/1987 | Fleming | 241/222 |
| 4,796,819 A | 1/1989 | Waterman | |
| 4,799,625 A | 1/1989 | Weaver, Jr. et al. | |
| 4,805,676 A | 2/1989 | Aikins | |
| 4,898,221 A | 2/1990 | Eriksson | |
| 4,907,632 A | 3/1990 | Reuter | |
| 4,927,088 A | 5/1990 | Brewer | |
| 4,934,612 A | 6/1990 | Johnson | |
| 4,943,259 A | 7/1990 | Felstehausen | |
| 5,020,579 A * | 6/1991 | Strong | 144/176 |
| 5,041,057 A | 8/1991 | Felstehausen | |
| 5,062,571 A | 11/1991 | Arno et al. | |
| 5,078,327 A | 1/1992 | Kemetter | |
| 5,088,532 A | 2/1992 | Eggers et al. | |
| 5,137,219 A | 8/1992 | Morey | |
| 5,205,496 A | 4/1993 | O'Donnell et al. | |
| 5,230,475 A | 7/1993 | Gerner | |
| 5,293,479 A | 3/1994 | Quintero et al. | |
| 5,417,265 A | 5/1995 | Davenport et al. | |
| 5,472,146 A | 12/1995 | Doppstadt | |
| 5,526,885 A | 6/1996 | Kuvshinov et al. | |
| 5,676,238 A | 10/1997 | Saastamo | |
| 5,881,959 A | 3/1999 | Hadjinian et al. | |
| 5,924,637 A | 7/1999 | Niederholtmeyer | |
| 5,947,395 A | 9/1999 | Peterson et al. | |
| 6,026,871 A | 2/2000 | Chapman | |
| 6,293,479 B1 | 9/2001 | Kaczmarski et al. | |
| 6,318,056 B1 | 11/2001 | Rauch et al. | |
| 6,357,684 B1 | 3/2002 | Morey | |
| 6,641,065 B2 | 11/2003 | Bardos et al. | |
| 6,722,596 B1 | 4/2004 | Morey | |
| 6,729,567 B1 | 5/2004 | Morey | |
| 6,769,836 B2 | 8/2004 | Lloyd | |
| 6,814,320 B1 | 11/2004 | Morey et al. | |
| 6,830,204 B1 | 12/2004 | Morey | |
| 6,843,435 B2 | 1/2005 | Verhoef et al. | |
| 6,853,531 B2 | 2/2005 | Mather et al. | |
| 6,929,202 B2 | 8/2005 | Haikkala et al. | |
| 6,955,310 B1 | 10/2005 | Morey | |
| 6,978,955 B2 | 12/2005 | Verhoef et al. | |
| 7,011,258 B2 | 3/2006 | O'Halloran et al. | |
| 7,040,558 B2 | 5/2006 | Stelter et al. | |
| 7,044,409 B2 | 5/2006 | Stelter et al. | |
| 7,048,212 B2 | 5/2006 | Carey | |
| 7,070,132 B1 | 7/2006 | Gassman | |
| 7,077,345 B2 | 7/2006 | Byram et al. | |
| 7,441,718 B2 | 10/2008 | Seaman et al. | |
| 7,481,386 B2 | 1/2009 | Hartzler et al. | |
| 7,637,444 B2 | 12/2009 | Stelter et al. | |
| 7,874,504 B2 | 1/2011 | Chapman et al. | |
| 2002/0070301 A1 | 6/2002 | Stelter et al. | |
| 2002/0139877 A1 | 10/2002 | Beam, III | |
| 2003/0111566 A1 | 6/2003 | Seaman et al. | |
| 2006/0196981 A1 | 9/2006 | Stelter et al. | |
| 2007/0069051 A1 | 3/2007 | Hartzler et al. | |
| 2007/0108323 A1 | 5/2007 | Chapman et al. | |
| 2011/0006142 A1 | 1/2011 | O'Halloran et al. | |

OTHER PUBLICATIONS

Peterson 4710 Track-Mounted Recycler Preliminary Manual, cover page, pp. 11, 12, 138, 199. 200 and 219 (Aug. 2004).
RC6D Brush Chipper, 6" Capacity Disc, Rayco Manufacturing, Inc., 6 pages (Copyright 2006).
Rc I2D Brush Chipper, 12" Capacity Disc, Rayco Manufacturing, Inc., 7 pages (Copyright 2006).
RC12 Brush Chipper, 12" Capacity Drum, Rayco Manufacturing, Inc., 6 pages (Copyright 2006).
RC20 Brush Chipper, 20" Capacity Drum, Rayco Manufacturing, Inc., 6 pages (Copyright 2006).
Welcome to Rayco Manufacturing's Used Machines, http://www.raycopreowned.com/Nov. 1, 2006, 4 pages (Date Printed Nov. 1, 2006).

* cited by examiner

WOOD CHIPPER FEED ROLLER

This application is a National Stage Application of PCT/US2008/062207, filed May 1, 2008 in the name of Vermeer Manufacturing Company, a U.S. national corporation, applicant for the designation of all countries except the US, and Jeffrey D. Bradley, Edwin N. Galloway, James L. O'Halloran and Justin J. Humpal, citizens of the U.S., applicants for the designation of the US only, and claims priority to U.S. Provisional Patent Application Ser. No. 60/928, 927, filed May 10, 2007, and which applications are incorporated herein by reference. To the extent appropriate, a claim of priority is made to each of the above disclosed applications.

FIELD OF THE INVENTION

The present invention relates generally to chipper devices and, more specifically, the feed system including feed rollers.

BACKGROUND OF THE INVENTION

Chippers are used to reduce branches, trees, brush, and other bulk wood products into small chips. Chippers typically include a feed chute, a feed system for controlling the feed rate of wood products into the chipper, a chipping mechanism, a drive system for powering the feed system and the chipping mechanism, and a discharge chute. The feed chute cooperates with the feed system to move the wood products towards the chipping mechanism.

Through the operation of the feed system, products to be chipped are brought into contact with the chipping mechanism, which grinds, flails, or cuts the wood products into small pieces. These chips are propelled into the discharge chute and expelled from the chipper. The overall performance of a chipper is dependent on the ability of the feed system to continually grab and pull wood from the feed chute into the chipper. An improved feed system is desirable.

SUMMARY OF THE INVENTION

The present disclosure relates to a feed system that is configured to more effectively grab and pull brush and tree materials into the chipper. The system of the present disclosure is configured such that a large, heavy tree trunk can be continuously pulled into the chipper.

BRIEF DESCRIPTION OF THE DRAWINGS

FIG. 6b is an end view of a tooth of FIG. 6a;

FIG. 7 is a perspective view of an alternative embodiment of a feed roller of FIG. 6a;

FIG. 8 is a perspective view of an alternative embodiment of a feed roller of FIG. 6a.

DETAILED DESCRIPTION OF THE PREFERRED EMBODIMENT

Figure 1:
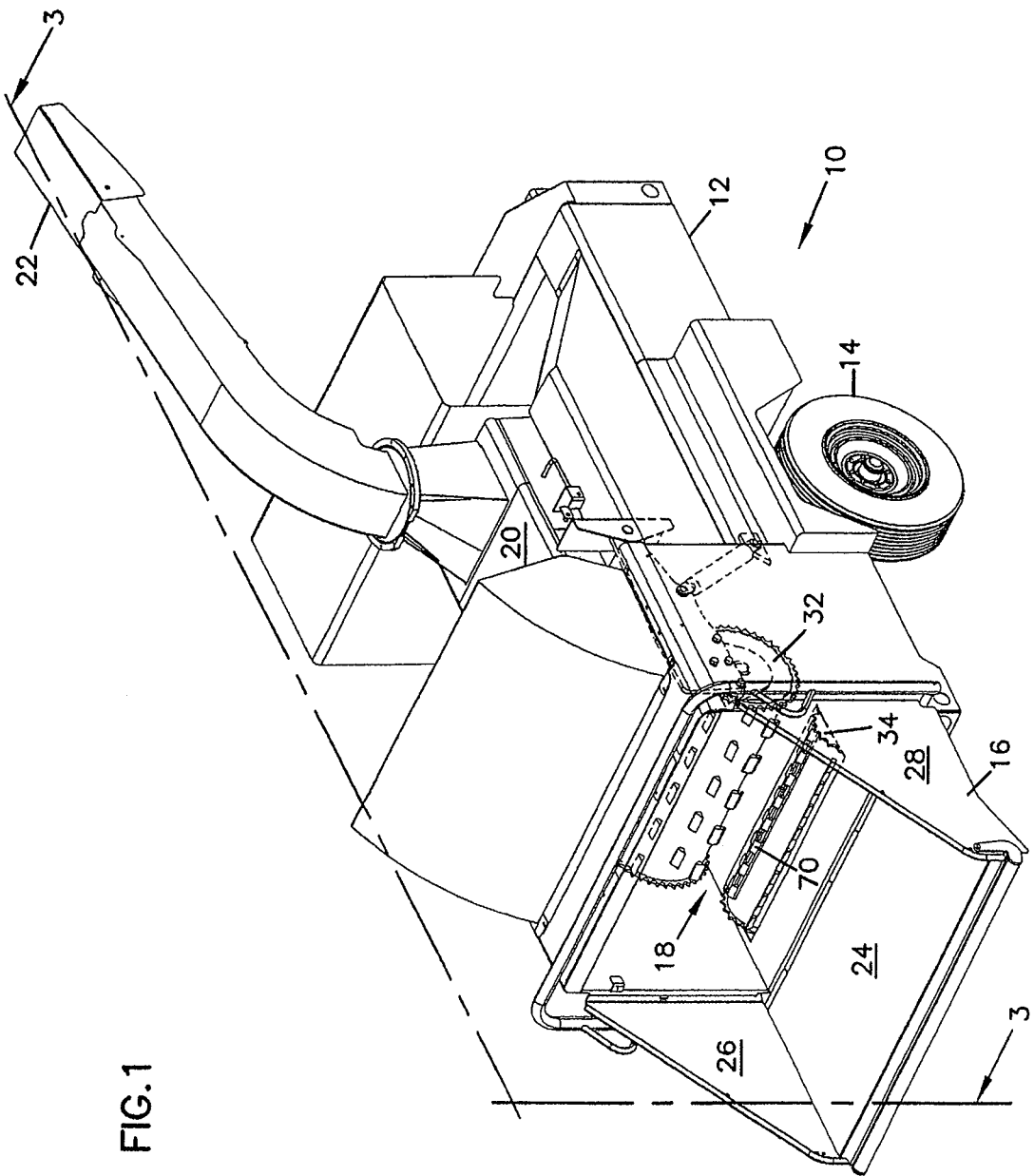
FIG. 1 is a perspective view of a chipper according to the principles of the present invention with certain portions of the chipper shown in hidden lines.
Figure 2:
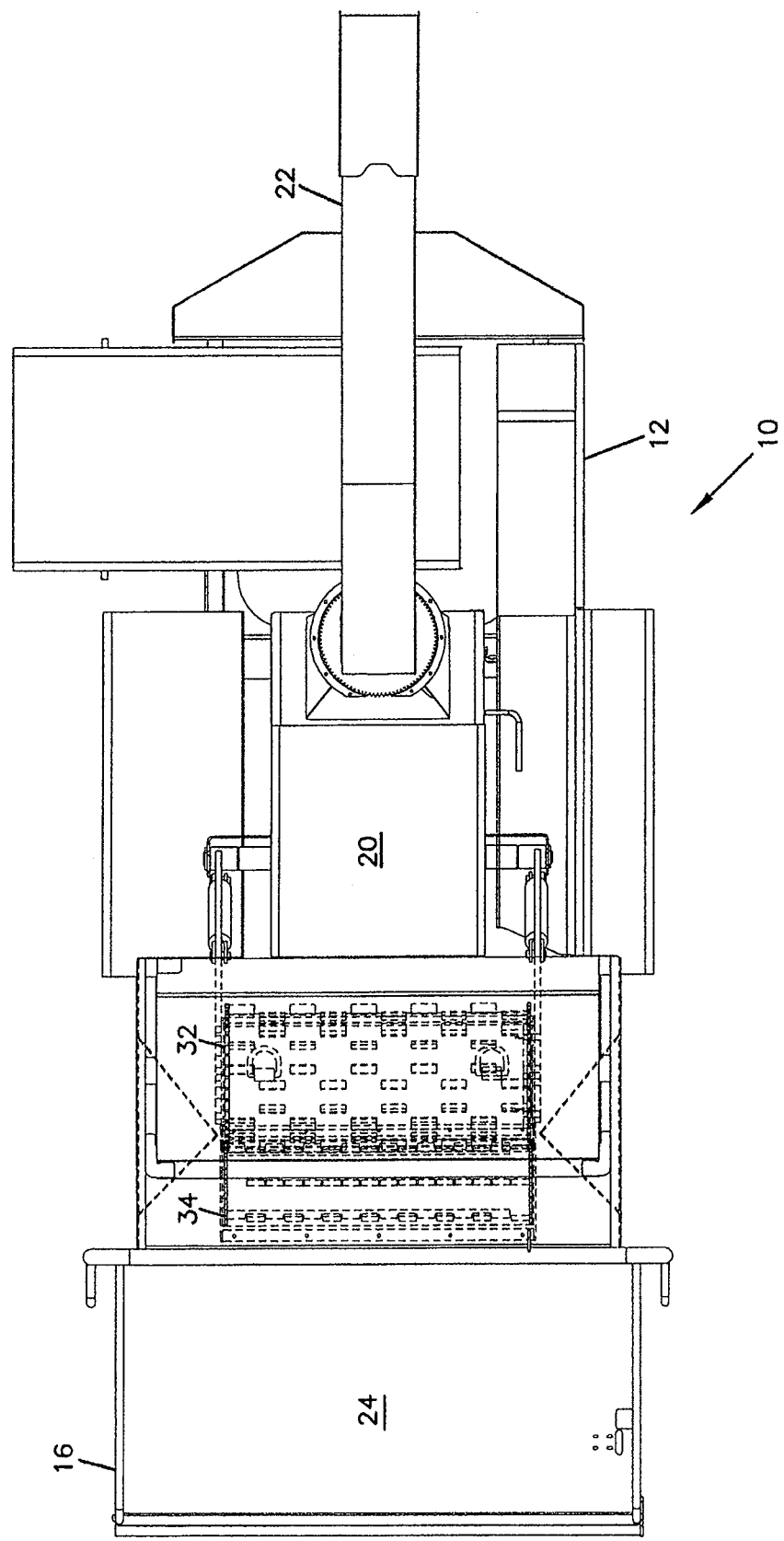
FIG. 2 is a top view of the chipper according to FIG. 1 with certain portions of the chipper shown in hidden lines.
Figure 3:
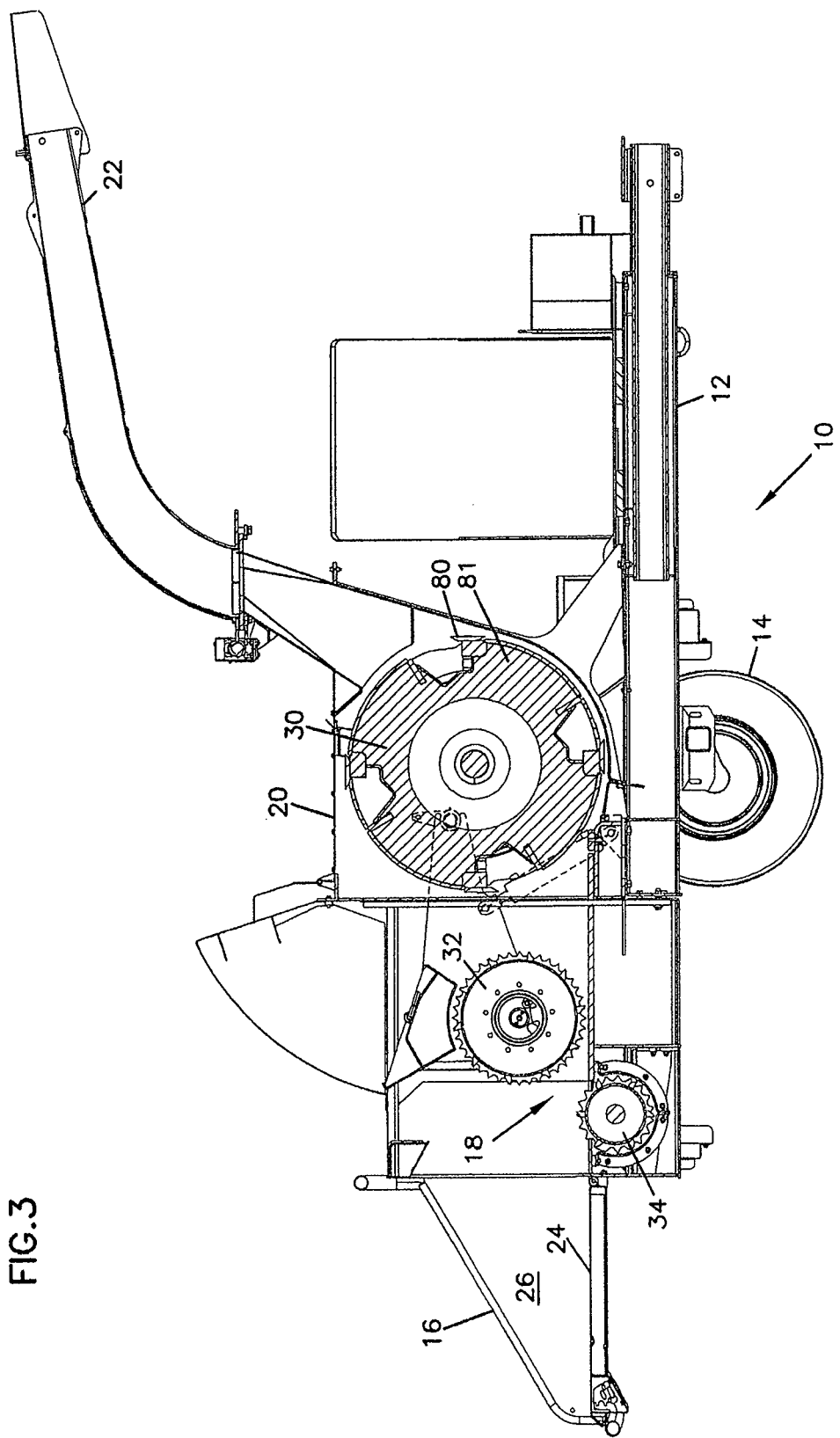
FIG. 3 is a side cross-sectional view of the chipper along lines 3-3 in FIG. 1.

Referring to FIGS. 1-5 a chipper is shown. In the depicted embodiment the chipper 10 is mounted to a frame 12 that rests on wheels 14, which enable the chipper 10 to be conveniently moved. The depicted chipper 10 includes a feed chute 16, which is also commonly referred to as a feed table. The feed chute 16 can be any structure located at the rear of the chipper 10 that facilitates the loading of materials to be chipped into the chipper 10. (The material to be chipped can be any material that the user desires to reduce to chips. The material is most commonly brush and tree parts, therefore, for convenience the material to be chipped will be referred to herein interchangeably as wood, trees, or brush.) The chipper 10 in the depicted embodiment includes a feed system 18 that grabs and pulls brush from the feed chute 16 into a body portion 20 of the chipper 10 which houses cutters 80 (see FIG. 3) that cut the brush into small chips. The cutters 80 are shown as blades mounted on a drum 81. However, it should be appreciated that the cutter can be any structure that is capable of breaking the material to be chipped into chips. Once the material is broken into small chips, the chips are then projected out of the chipper 10 through a discharge chute 22.

The feed chute 16 is provided at the rear of the chipper 10 to facilitate the loading of brush and trees into the chipper 10. In the depicted embodiment the feed chute 16 includes a flat table portion 24 (loading surface) and two angled side walls 26, 28. It should be appreciated that many other configurations of the feed chute 16 are possible. Feed chutes are described in greater detail in a related application filed on May 10, 2007 titled Wood Chipper Infeed Chute, which is incorporated herein by reference. Once the brush is grabbed by the feed system 18, the brush is moved into contact with the cutter drum 30 that is housed within the body 20 of the chipper 10. The cutter drum 30 spins cutting blades 80 at a high rate of speed which thereby reduces the brush and wood that contacts the drum 30 into small chips that are projected out the discharge chute 22. Drum arrangements are described in greater detail in a related application filed on May 10, 2007 titled Chipper Drum with Integral Blower which is incorporated herein by reference (No. 60/928,928).

Still referring to FIGS. 1-5, the feed system 18 of the chipper is described in greater detail below. In the depicted embodiment the feed system 18 includes an upper feed roller 32 and a lower feed roller 34. In the depicted embodiment, the upper feed roller 32 rotates counter clockwise and the lower feed roller 34 rotates clockwise to grab and pull material into the chipper 10. In the depicted embodiment, the rotation is powered by a hydraulic drive motor (not shown). In the depicted embodiment the lower feed roller 34 is positioned closer to the chute 16 than the upper feed roller 32. In the depicted embodiment the axis of the lower feed roller 34 is below the table portion 24 of the feed chute 16. At least the teeth on the lower feed roller 34 are projecting above the surface of the table 24. In the depicted embodiment, portions of the lower feed roller other than the teeth extend above the surface of the table 24. Also, in the depicted embodiment the upper and lower feed roller overlap when viewed from above. In the particular embodiment, the overlapping portion of the upper and lower feed rollers measured horizontally in the front-to-back direction is less than the radius of the lower feed roller. In the depicted embodiment, the axis of the lower feed roller 34 does not overlap with the outer surface of the upper feed roller 32.

Figure 4:
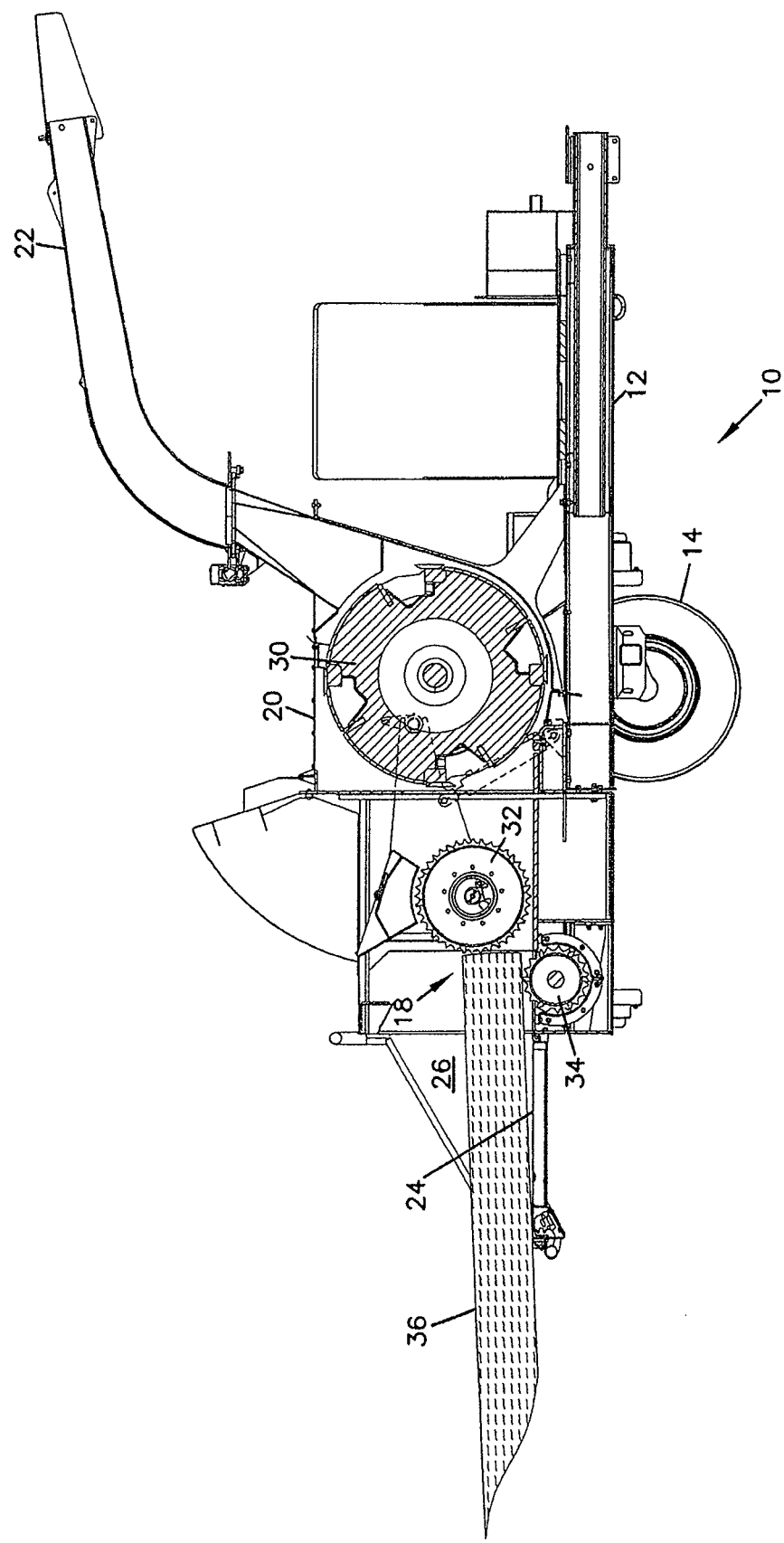
FIG. 4 is a side cross-sectional view of the chipper along lines 3-3 in FIG. 1 with a log on the feed chute.
Figure 5:
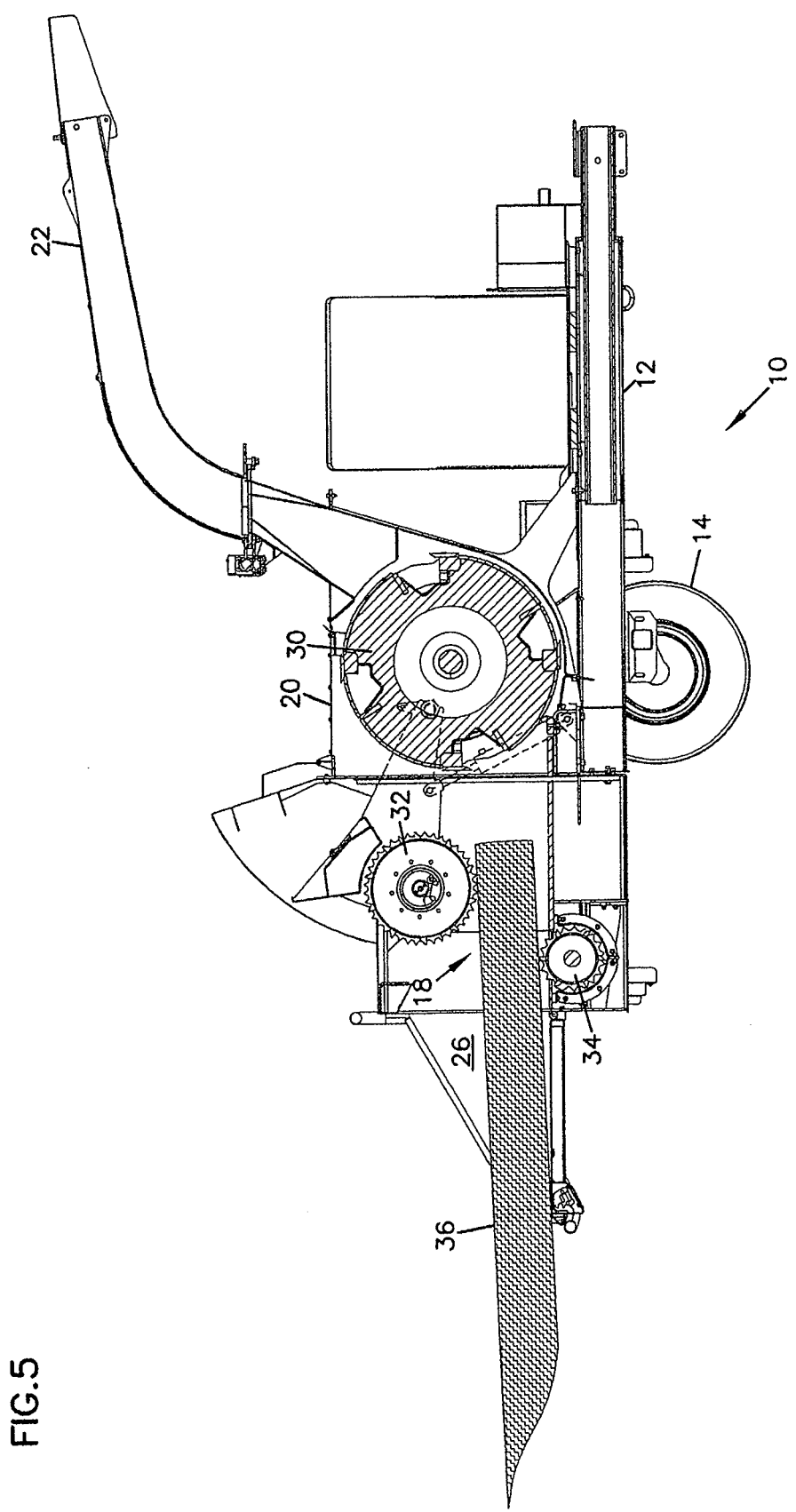
FIG. 5 is a side cross-sectional view of the chipper along lines 3-3 in FIG. 1 with a log engaged in the feed rollers.

Referring to FIGS. 4 and 5, a log 36 is shown being loaded into the chipper 10. In FIG. 4 the log 36 is shown on the table portion 24 of the chute 16 engaged with the lower feed roller 34. The lower feed roller 34 engages the bottom surface of the log 36 and drags the log 36 up against the upper feed roller 32. The upper feed roller 32 climbs the end of the log 36 and engages the top surface of the log 36. Then the upper and lower rollers 32, 34 together pull the log 36 into the chipper body 20. The relative position of the feed rollers enables the above sequence. It should be appreciated, that in alternative embodiments other relative positions are also possible. For example, in an alternative embodiment the axis of the lower feed roller 34 might overlap with the outer surface of the upper feed roller 32.

Referring to FIGS. 3-5 and 9, the upper roller 32 is shown mounted to a bracket assembly 39 that allows the upper roller 32 to pivot up and down to adjust for the different thickness of logs and brush. The bracket assembly includes a pair of arms 38, 40 that rotatably connect to the first end 46 and the second end 48 of the upper feed roller 32. The arms 38, 40 have a length $L_1$ that extend in a front-to-back direction relative to the chipper body. Ends 41 of the arms 38, 40 pivotably attach to the body of the chipper 10 about a horizontal axis that extends across the width of the chipper. In the depicted embodiment a cylinder 42 is attached to both arms 38, 40 to apply pressure and dampen the motion of the upper feed roller 32. In the depicted embodiment the cylinders are active (powered), but it should be appreciated that in other embodiment they can be passive (not powered). Also, a guard 44 is mounted between the arms 38, 40 on top of the feed roller 32 to prevent brush from entering the chipper 10 above the upper feed roller 32. The length $L_1$ of the arms in the depicted embodiment is greater than the diameter $D_1$ of the upper feed roller 32. In the depicted embodiment the length $L_1$ is about 30 inches and $D_1$ is about 20 inches. The length of the arms 38, 40 can have an affect on the ability of the upper feed roller 32 to climb the end of log 36. It should be appreciated that many other configurations of the bracket assembly 39 are possible. For example, in some embodiments springs are attached to the arms to bias the upper feed roller 32 downwardly to ensure that the upper feed roller 32 solidly engages the logs. Systems for applying down pressure are described in greater detail in a related application filed on May 10, 2007 titled System for Controlling the Position of a Feed Roller which is incorporated herein by reference (the serial number of the application has not been assigned).

Figure 6A:
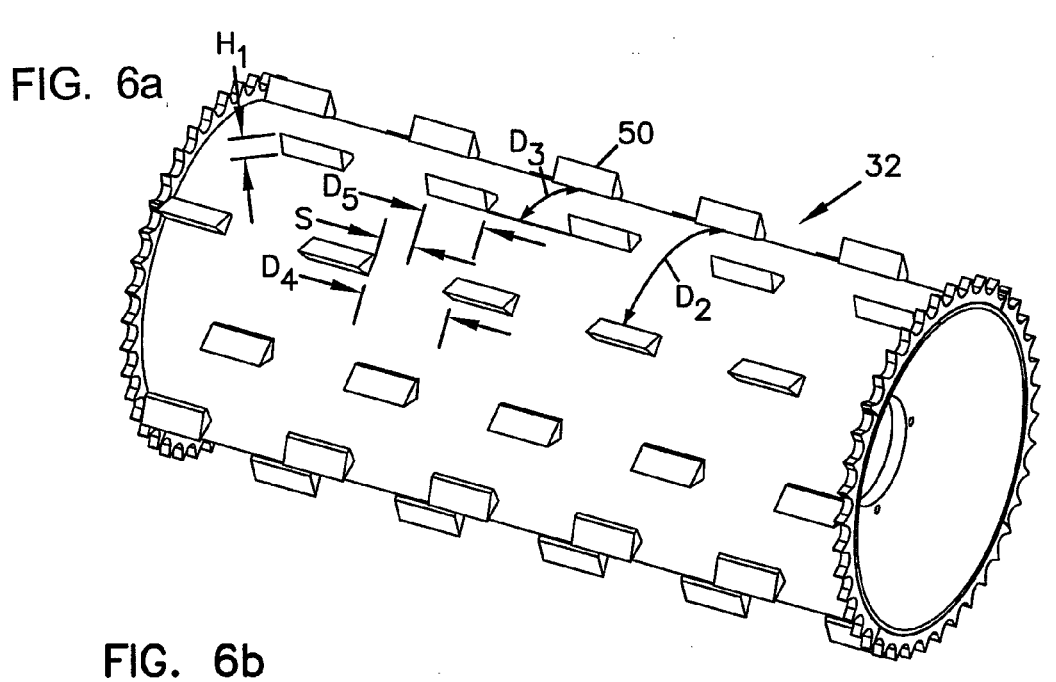
FIG. 6a is a perspective view of a feed roller of FIG. 1.
Figure 6B:
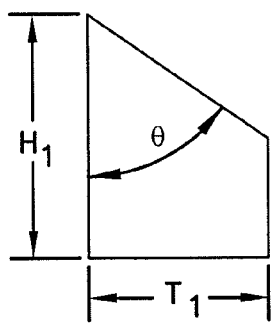

Referring to FIGS. 6a, 6b, 7, and 8 the feed rollers 32, 34 are described in greater detail. The upper feed roller 32 is shown in FIG. 6a. Across the surface of the upper feed roller 32 are a plurality of claws 50 that are configured to dig into logs and brush to pull such material into the chipper 10. In the depicted embodiment the upper feed roller 32 includes rows of claws 50 that define gripping paths. The claws 50 in adjacent rows are staggered such that the claws 50 in the same gripping path are spaced apart a distance $D_2$ which is twice the distance $D_3$, which is the distance that each row is spaced apart. In the depicted embodiment, each row includes five claws 50 and there are a total of 10 rows equally spaced apart. Each of the claws 50 are spaced apart by a distance $D_4$ and each claw 50 has a length $D_5$. In the depicted embodiment, $D_4$ is greater than $D_5$; therefore, there are gaps between the claw 50 columns. In one embodiment $D_4$ is about 4-5 inches and $D_5$ is about 3-4 inches. The gaps have a width equal to half of the difference between $D_4$ and $D_5$. Each claw 50 has an asymmetric side profile that includes a sharp edge which enables it to dig into the surface of a log. The height $H_1$ of the claws 50 is related to the spacing $D_2$. In the depicted embodiment the height $H_1$ and distance $D_2$ are configured such that one or more claws 50 are engaged in the surface of a log 36 at all times. In one embodiment the diameter of the upper feed roller is about 15-25 inches and the height of the teeth in each of the 10 rows is about ½ to 2 inches. In the same embodiment the diameter of the lower feed roller is about 9-12 inches and the height of each of the teeth in the 6 rows is about ¾ to 2 inches. In the depicted embodiment, the teeth have thickness $T_1$ between about ½ to 1½ inches and the top surface is angled θ at between about 45-65 degrees relative to the surface that extends generally perpendicularly away from the feed roller. In the depicted embodiment the teeth are asymmetrical in that they are configured to operate different depending on the direction of rotation. In the depicted embodiment the teeth are configured to engage the material to be chipped more aggressively when pulling the material into the chipper than when backing the material out of the chipper. In the depicted embodiment the claws are sized and spaced apart such that at least one claw of the upper feed roller and at least one claw of the lower feed roller engage the surface of a log held between the upper and lower feed rollers. To accomplish this end, in the depicted embodiment a line connecting the tip of the claws in adjacent rows does not cross into the outer surface of the feed rollers. It should be appreciated that the inclusion of actual and relative sizes herein is not meant to be limiting. Many other different configurations are possible.

Figure 7:
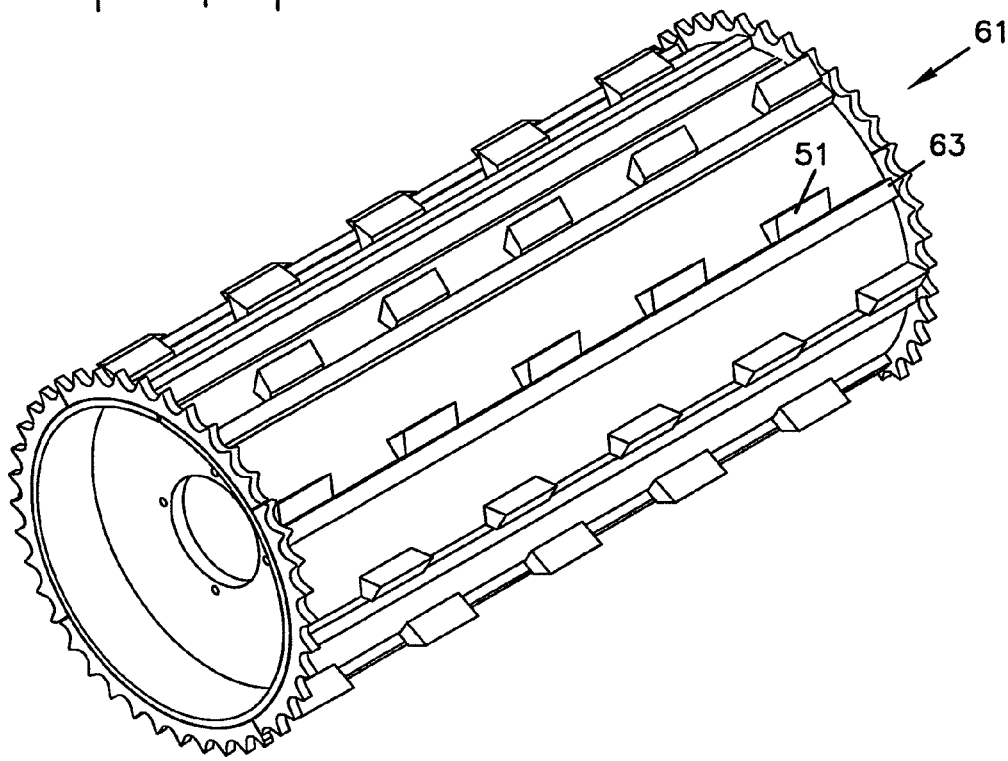

Referring to FIG. 7, an alternative embodiment of the feed roller 32 is shown. The feed roller 61 is generally cylindrical in shape. In the depicted embodiment the bars 63 run along the length of the feed roller 61 and connect to the claws 51 to provide auxiliary support to the claws 51. In certain conditions, the bars 63 are also advantageous in that they aid in the feeding. For example, the bars 63 can be equally or even more effective that the claws 51 in feeding brush.

Figure 8:
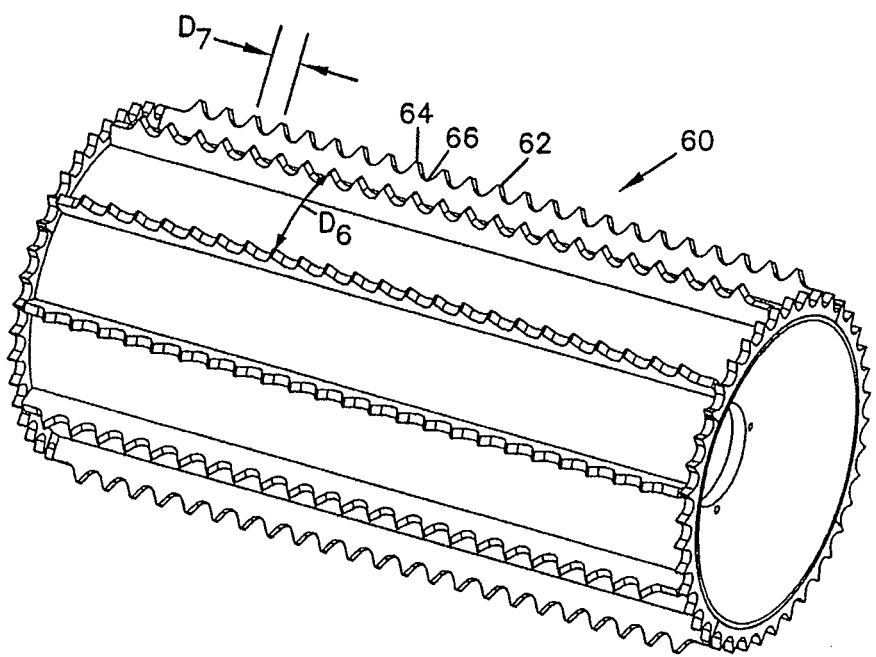
Figure 9:
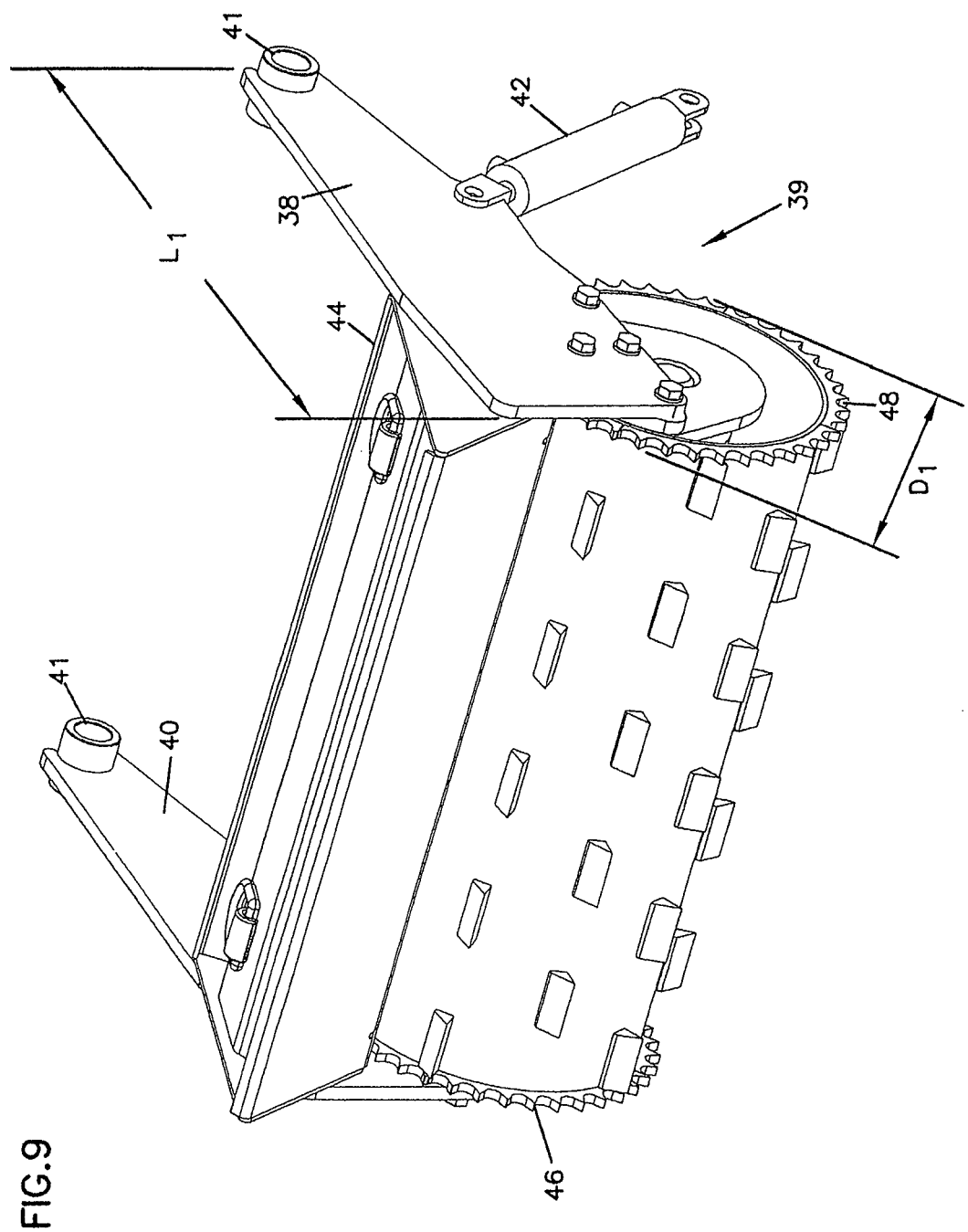
FIG. 9 is a perspective view of a feed roller of FIG. 1 attached to a mounting arm.

Referring to FIG. 8, another alternative embodiment of the feed roller 32 is shown. The feed roller 60 is generally cylindrical in shape. Instead of rows of claws 50, the roller 60 includes a number of a ribbed plates 62 fixed to the outer surface of the feed roller 60. In the depicted embodiment the ribbed plates 62 are spaced apart by a distance $D_6$. Each ribbed plate 62 includes a plurality of peaks 64 and valleys 66 thereon that are spaced apart by a distance $D_7$. In the depicted embodiment the ribbed plates 62 are welded onto the outer surface of the feed roller 60. The ribbed plates 62 are configured to grab and pull material into the chipper 10 when rotated. It should be appreciated that many other variations of this embodiment are possible.

Referring back to FIG. 1, a fourth embodiment of a feed roller configuration is shown. The lower feed roller 34 is shown to include a number of claws 70 that are connected to each other and welded to the outer surface of the feed roller 34. The claws 70 are similar in configuration to those claws 50 illustrated in FIG. 6a and described in detail above. The claws 70 in FIG. 1 are connected together like the peaks 64 in the embodiment shown in FIG. 8. The claws 70 are shorter than the claws 50. The claws 70 in each row are offset from each other like the claws 50 in the embodiment shown in FIG. 6a. The claws 70 and 50 are orientated such that when the upper feed roller 32 rotates counterclockwise and the lower feed roller 34 rotates clockwise, together they grab and pull materials to be chipped into the chipper 10. It should be appreciated that many other embodiments of the feed rollers are possible.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A chipper comprising:
   a feed chute including a loading surface positioned at a rear of the chipper;
   a cutter positioned between a front of the chipper and the loading surface;
   a lower feed roller positioned between the loading surface and the cutter, wherein a longitudinal axis of the lower feed roller is positioned below the loading surface and a portion of the lower feed roller extends above the loading surface;
   an upper feed roller configured to be lowered to apply downward force on the materials to be reduced by the chipper, the upper feed roller having a longitudinal axis that is positioned above the loading surface and between the longitudinal axis of the lower feed roller and the cutter;
   wherein at least a portion of the upper feed roller overlaps with a portion of the lower feed roller in a vertical direction; and
   wherein when the upper feed roller is in a lowered position, the outer surface of the upper feed roller does not overlap with the longitudinal axis of the lower feed roller in a vertical direction to enable materials to be reduced by the chipper to climb the portion of the lower feed roller that extends above the loading surface prior to downward force being applied thereto.

2. The chipper according to claim 1, wherein the upper feed roller is pivotably mounted to the chipper to allow an upper feed roller to move up and down.

3. The chipper according to claim 2, wherein the upper feed roller is attached to mounting arms that have a length that is greater than a diameter of the upper feed roller.

4. The chipper according to claim 1, wherein the diameter of the upper feed roller is larger than the diameter of the lower feed roller.

5. The chipper according to claim 1, wherein the upper and lower feed rollers include a plurality of claws spaced apart on the upper and lower feed rollers.

6. The chipper according to claim 5, wherein the claws are arranged in axial rows on the feed rollers and the claws in adjacent rows are staggered.

7. The chipper according to claim 5, wherein the claws are asymmetrical such that they operate differently when rotated clockwise and counterclockwise.

8. The chipper according to claim 5, wherein the lower feed roller extends above the loading surface such that more than the claws on the lower feed roller extend above the loading surface.

9. The chipper according to claim 5, wherein the diameter of the upper and lower feed rollers and the height of the claws thereon are configured such that at least one claw of the upper feed roller and at least one claw of the lower feed roller engage the surface of a log held between the upper and lower feed rollers.

10. The chipper according to claim 9, wherein a line connecting the tip of the claws in adjacent rows does not cross into the outer surface of the feed rollers.

11. A chipper feed system comprising:
    a lower feed roller;
    an upper feed roller;
    wherein the axes of rotation of the upper and lower feed rollers are offset in the front-to-back direction;
    wherein an axis of the lower feed roller is closer to a loading surface than the axis of the upper feed roller;
    wherein at least a portion of the upper feed roller overlaps with a portion of the lower feed roller in a vertical direction; and
    wherein a periphery edge of the upper feed roller does not overlap the axis of rotation of the lower feed roller such that material to be chipped engages the lower feed roller before engaging the upper feed roller.

12. The feed system of claim 11, wherein an overlapping portion of the upper and lower feed rollers measured horizontally is less than the radius of the lower feed roller.

13. The feed system of claim 11, wherein the lower feed roller has a diameter that is less than or equal to about 15 inches, and the upper feed roller has a diameter that is greater than or equal to about 15 inches.

14. The feed system of claim 11, wherein the upper feed roller is movably mounted to the chipper such that the feed roller can move upwardly and downwardly.

15. The feed system of claim 11, wherein the upper feed roller is mounted to an arm that pivots.

16. A chipper comprising:
    a feed chute including a loading surface positioned at a rear of the chipper;
    a cutter positioned between a front of the chipper and the loading surface;
    a lower feed roller positioned between the loading surface and the cutter, wherein a longitudinal axis of the lower feed roller is positioned below the loading surface and a portion of the lower feed roller extends above the loading surface;
    an upper feed roller having a longitudinal axis that is positioned above the loading surface and between the longitudinal axis of the lower feed roller and the cutter;
    wherein when the upper feed roller is in a lowered position, the outer surface of the upper feed roller does not overlap with the longitudinal axis of the lower feed roller in a vertical direction; and
    wherein the upper and lower feed rollers include a plurality of claws spaced apart on the upper and lower feed rollers.

17. The chipper according to claim 16, wherein the claws are arranged in axial rows on the feed rollers and the claws in adjacent rows are staggered.

18. The chipper according to claim 16, wherein the claws are asymmetrical such that they operate differently when rotated clockwise and counterclockwise.

19. The chipper according to claim 16, wherein the lower feed roller extends above the loading surface such that more than the claws on the lower feed roller extend above the loading surface.

20. The chipper according to claim 16, wherein the diameter of the upper and lower feed rollers and the height of the claws thereon are configured such that at least one claw of the upper feed roller and at least one claw of the lower feed roller engage the surface of a log held between the upper and lower feed rollers.

21. The chipper according to claim 20, wherein a line connecting the tip of the claws in adjacent rows does not cross into the outer surface of the feed rollers.

* * * * *